Figure 1:
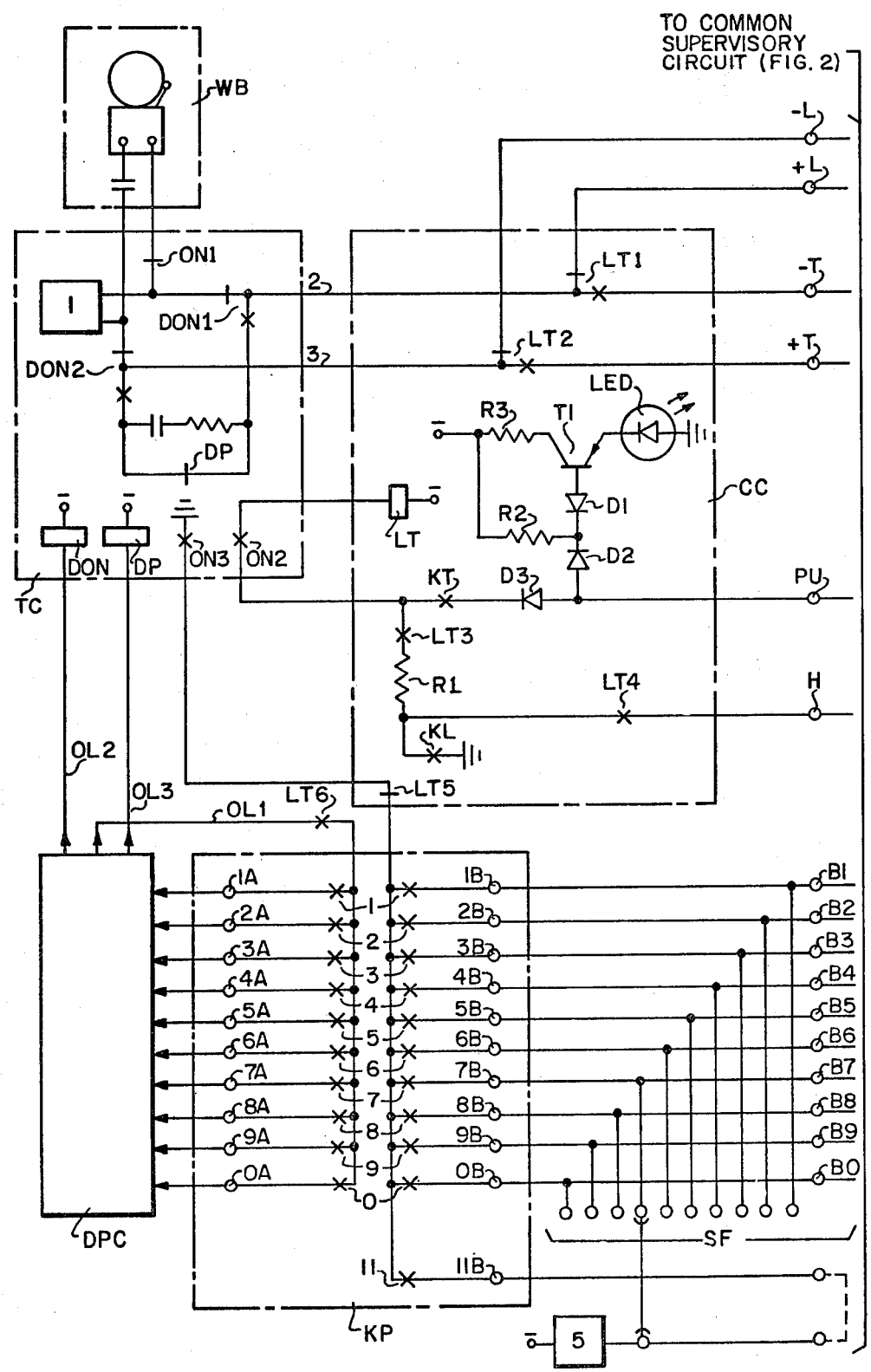

United States Patent [19]
Warman

[11] 3,931,477
[45] Jan. 6, 1976

[54] TELEPHONE INTERCOMMUNICATION SYSTEMS

[75] Inventor: Bloomfield James Warman, Como, Italy

[73] Assignee: GTE International Incorporated, Stamford, Conn.

[22] Filed: Sept. 19, 1974

[21] Appl. No.: 507,322

[30] Foreign Application Priority Data
Oct. 26, 1973 United Kingdom............... 50058/73

[52] U.S. Cl................ 179/37; 179/1 H; 179/18 AD
[51] Int. Cl.²......................................... H04M 3/00
[58] Field of Search........ 179/1 CN, 18 AD, 18 BC, 179/37, 38, 39, 40, 84 B, 99, 30, 17 B, 19, 27 D, 1 H

[56] References Cited
UNITED STATES PATENTS

| | | | |
|---|---|---|---|
| 3,342,944 | 9/1967 | Barbato et al. | 179/37 |
| 3,576,397 | 4/1971 | Pell et al. | 179/37 |
| 3,843,845 | 10/1974 | Ridley | 179/99 |

*Primary Examiner*—Thomas A. Robinson
*Attorney, Agent, or Firm*—Robert J. Black

[57] ABSTRACT

A private telephone intercommunication system including facilities for connecting the system to a telephone central office. Separate communication channels and supervisory means are provided for external and internal calls.

4 Claims, 2 Drawing Figures

TELEPHONE INTERCOMMUNICATION SYSTEMS

This invention concerns improvements in telephone intercommunication systems, and relates more especially to a private telephone intercommunication system suitable for connection to one or more external exchange telephone lines.

Conventional private branch exchange systems for connection to an external telephone line and comprising a main telephone station and a number of extension telephone stations are well known. Such exchange systems may also provide for intercommunication between the extension telephone stations, independently of the main station.

Hitherto known systems of this type have a number of disadvantages, however. For example routing of incoming calls from an external exchange line to the extension stations requires that the incoming call be answered from the main station and then transferred to the selected extension. This requires that an operator be permanently in attendance at the main telephone station, or alternatively that the external exchange line be switched through to a selected extension station for answering of incoming calls in the absence of the operator. In some circumstances it may be uneconomic to provide for a permanent operator to attend such a telephone system, and moreover it may not always be known in advance from which extension telephone station it is convenient for incoming calls to be answered. Another disadvantage of this type of system is that to provide for mutual intercommunication between the extension stations, it is necessary for a relatively complicated arrangement of additional station selection switches and communication lines to enable each extension station to select another extension station without routing the call through the main station and the attendant operator.

It is accordingly a primary object of this invention to provide a telephone intercommunication system for connection to one or more external exchange lines and providing access between each of a plurality of extension telephone stations and each external exchange line without the requirement for a main telephone station attended by an operator. It is a further object of the invention to provide for intercommunication between the extension stations in a simple manner and without requiring a complicated arrangement of station selection keys.

According to one aspect of the invention there is provided a telephone intercommunication system including a plurality of extension telephone stations, one or more supervisory means each providing access to and warning of incoming calls from a communication line external to the system, and one or more internal communication lines; the arrangement being such that in an idle condition all of said extension telephone stations are normally interconnected via an internal communication line to provide for communication between any two or more of said extension telephone stations when in a line-looped or off-hook condition, and each supervisory means can provide to all of said extension stations, independently of said internal communication line or lines, warning of an incoming call from the corresponding external line; and each extension telephone station including manually operable line coupling switch means giving access via the corresponding supervisory means to the corresponding external communication line, independently of said internal communication line or lines.

Thus in the arrangement according to the invention, no main telephone station attended by an operator is required, a common supervisory means providing access to the external exchange line from each of the extension telephone stations, each of which receives warning of an incoming call. Moreover since access to the external exchange line is provided independently of said internal communication line, the latter remains free for calls between the remaining extension telephone stations while one of said stations is connected to the external exchange line. Advantageously, means may be provided in said supervisory means for preventing access of other extension telephone stations to the external exchange line while one of said extension stations is connected thereto.

According to another aspect of the invention, in order to provide in a simple manner for dialed code signal transmission from the extension stations to the external exchange line, and also to provide for selection of an extension station to be called via said internal communication line, each extension telephone station includes a digital push button assembly arranged so that each push button actuates contacts in each of two electrically separate groups, one of which serves for the selective calling, independently of a said internal communication line, of any other station of the system, and the other of which serves for the initiation of dialed code signal transmission for the establishment of an external call, the contacts of said one group being rendered effective when the corresponding telephone station is connected to an internal communication line and the contacts of said other group being rendered effective when said line coupling switch means is operative to establish a connection to a corresponding external communication line.

Thus the contacts in the group serving for selective calling of other extension stations of the system may simply be connected via a suitable strapping field to buzzers in each of the extension stations, so that upon depression of the corresponding push button a buzzer in the selected station operates. Since all of the extension stations are interconnected by the internal communication line in the idle condition, it would of course be possible for any extension station to listen in to an internal call by going off-hook, but since only the buzzer in the selection station sounds, only that station would normally be prompted to go off-hook.

According to another aspect of the invention, means may be provided for coupling one extension telephone station directly to the external line in the event of failure of a power supply for operation of the intercommunication system. Thus in the event of a power failure, the selected extension station operates in the manner of a single telephone instrument directly connected to an exchange line, and communication with the external line is not lost.

Figure 2:
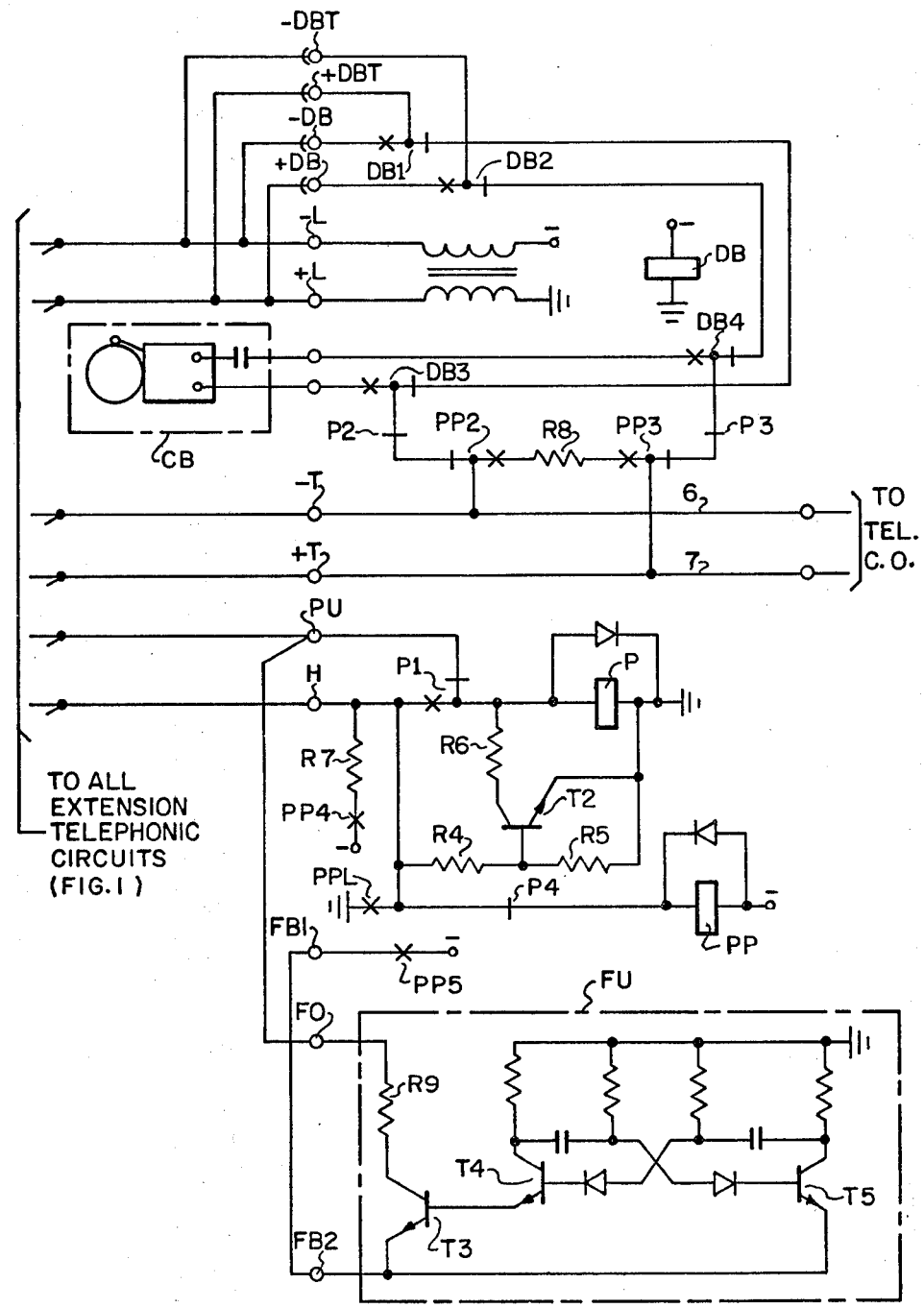

The invention is illustrated by way of example in the accompanying drawings, in which:

FIGS. 1 and 2 together make up a circuit diagram of a telephone intercommunication system according to the invention.

In the drawings, there is shown a telephone intercommunication system arranged to provide up to 10 telephone extension stations with access to a single external exchange line, as well as access to one another via an independent internal communication line. FIG. 1 shows the circuitry which is repeated for each extension station, and FIG. 2 shows a single supervisory circuit which is common to all of the extension stations.

Referring now to FIG. 1, each extension telephone station comprises conventional telephone circuitry indicated within the box TC in broken lines, a push button keypad shown within the box KP in broken lines, a dial pulse circuit shown by the box DPC, and a manually operable control circuit included within the box CC shown in broken lines, to provide for optional selection of a connection to an external exchange line, or of transfer from an external exchange line to a local line connection via the internal connection line. In addition one only of the extension stations includes a wall bell indicated within the box WB in broken lines, for the purpose to be described below.

As is well known, the circuit TC includes a conventional talk and listen circuit 1 connected to the telephone handset, a hook switch having a normally closed contact ON1 and normally open contacts ON2 and ON3, and dial pulse relays DON and DP each connected to the battery power source. The relay DON has normally closed contacts DON1 and DON2 provided in leads 2 and 3 from the talk and listen circuit. The relay DP has a contact in a pulsing circuit which is connected to the leads 2 and 3 by make contacts DON1 and DON2 when the relay DON is energized.

The keypad KP is of known type comprising twelve push buttons each having two operable make contacts. Only the contacts of keys 1 to 0 are connected, as indicated, to outputs 1A to 0A and 1B to 0B of the keypad circuit. In addition, one contact of the eleventh key is connected to an output 11 of the keypad circuit, for the purpose to be described below. The outputs 1A to 0A are connected via corresponding leads to the dial pulse circuit DPC, of which output leads are connected respectively to the relays DON and DP. The dial pulse circuit is an electronic integrated circuit element which may be purchased as a component from any number of well known suppliers of telephone equipment, its arrangement being such that when a potential, derived from the dial pulse circuit over an output lead OL1 and via relay contact LT6, is applied to one of the dial pulse circuit inputs 1A to 0A from the keypad KP, the relays DON and DP are operated over leads OL2 and OL3 to transmit a number of dial impulses corresponding to that input, over the leads 2 and 3 of the circuit TC. It will be appreciated that circuits DPC and TC may be modified to provide multifrequency tone sending when required for use with an external exchange operating on this system. The outputs 1B to 0B of the keypad KP are connected via a strapping field SF to output terminals B1 to B0 of the telephone extension station, the respective outputs B1 to B0 of the several extensions being connected together. The strapping field SF of each telephone extension provides a connection between one of the terminals B1 to B0 and a buzzer of the individual extension station, for example, as indicated by the dotted line connection between output 7 and buzzer 5 in the drawing. Although the arrangement shown provides for only 10 outputs to 10 telephone extension stations, it is possible for two extension telephones close together to share the buzz calling address, either by both buzzers of the two stations being strapped together or a single buzzer being provided. Furthermore, a secretary's telephone instrument can be strapped to have the same address as her principal, so that she can answer all calls to his telephone instrument. In such a case the output 11 of the secretary's telephone instrument may be connected to the buzzer of the principal's telephone to permit local buzz calling of the principal by the secretary. As will be described below, the keypad KP can provide an output signal from only one of the groups of outputs 1A to 0A or 1B to 0B and 11 at a time, under the control of relay contacts LT5 and LT6. The circuit CC includes a relay LT connected between the battery power supply and one side of the switch contact ON2; a push button switch KT for selection of the external exchange line; a push button switch KL for transfer to a local line connection via the internal communication circuit; and a warning signal provided by a light emitting diode LED for indicating the busy condition of the external exchange line.

Referring now to FIG. 2 there will be described the supervisory circuit common to all the telephone line extensions. This circuit includes terminals −T and +T connected in common to the corresponding output terminals of all the individual circuits CC, and providing access to an external telephone line through the public exchange, via wires 6 and 7. Terminals −L and +L of the supervisory circuit are also connected in common to the corresponding terminals of each circuit CC (with the exception of one, see below) to provide connection between each of the extension telephone stations and a local battery feed supply providing power for internal communication between extension telephone stations connected, in parallel, to the terminals −L and +L. In the idle condition of the communication system, the public exchange line wires 6 and 7 are connected via relay contacts P2, P3, PP2, PP3, DB3 and DB4 to a system of calling bells indicated within the box CB shown in dotted lines, these bells being arranged to provide a common warning audible from all of the extension stations. Terminals PU and H of the supervisory circuit provide connection between the corresponding terminals of all circuits CC and a circuit including relays P, and PP for controlling access of the individual extension stations to the public exchange line together with an electronic multivibrator element which operates to provide a flashing signal to the light-emitting diode of circuit CC, when required. The operation of this circuit will be described in more detail below. The supervisory circuit further comprises a relay DB connected across the battery power source for the intercommunication system, this relay serving to sense a failure of the power supply. Corresponding contacts DB1 to DB4 of the relay are connected as shown so that upon failure of the power supply the public exchange lines 6 and 7 are connected to terminals −DBT and +DBT of the supervisory circuit, these latter terminals being connected via a strapping indicated to output terminals −L and +L of that circuit CC of the one corresponding extension telephone which is not directly connected to the corresponding terminals −L and +L of the supervisory circuit and which includes the wall bell WB. Thus when there is a power failure this telephone station is directly connected to the exchange line to operate as a single telephone instrument. When the relay DB is energized the connection between the circuit CC of this telephone and the terminals −L and +L of the supervisory circuit is established via the strapping indicated, the terminals −DBT and +DBT and −DB and +DB, and the relay contacts DB1 and DB2.

The operation of the telephone intercommunication circuit described above will now be described in more detail below.

1. Local call between extension telephones

With the system in the idle condition as shown in the drawing, when one of the extension telephones goes off-hook the talk and listen circuit 1 is connected via leads 2 and 3 and relay contacts LT1 and LT2 to the terminals −L and +L of the circuit CC and thence to the corresponding terminals of the supervisory circuit. The local battery feed from the supervisory circuit is thus extended to the talk and listen circuit 1. The relay contact LT5 provides ground potential via the operated hook switch contacts ON3, to that set of the keypad contacts connected to outputs 1B to 0B and 11B, and thus upon closure of any one of these contacts ground potential is transmitted by the corresponding output and the strapping field SF to the corresponding buzzer of another one of the telephone stations. When this called telephone station now goes off-hook the talk and listen circuit 1 is likewise connected to the terminals −L and +L of the supervisory circuit and thus an internal communication connection is established between the two extension telephone stations. For a conference call, any number of telephone stations may likewise be buzzed and establish a connection to the local line circuit provided by terminals −L and +L of the supervisory circuit. If an extension telephone called is one of two extensions connected together with a common buzzer, for example a secretary's telephone provided with the buzzer and connected together with a principal's telephone extension then the call may be answered by the secretary and then if necessary can be transferred to the principal by operation of her keypad contact 11 to operate the buzzer of the principal extension.

2. Exchange call

Assuming that an incoming call is received, the calling bells CB will provide a warning signal, and any one of the extension telephone stations has the option of answering the call. When a telephone extension now goes off-hook, the talk and listen circuit 1 is, as described above, initially connected to terminals −L and +L. However, to establish a connection with the external exchange line the push button KT of circuit CC is operated at the answering extension, and thus battery potential is extended from the circuit CC via relay LT, the now closed hook switch contact ON2, switch contact KT, and diode D3, to the terminal PU of the supervisory circuit. Assuming that relay P of the supervisory circuit has not already been energized, relay LT of the circuit CC is operated in the circuit: battery, winding of relay LT, operated hook switch contacts ON2, operated key contact KT, diode D3, terminal PU of the circuit CC, terminal PU of the supervisory circuit, and the winding of relay P in parallel with the emitter-collector path of transistor T2, to ground. In this condition, the bias applied to the base electrode of transistor T2 from battery, via the winding of relay PP, contact P4 (normal) and resistors R4, R5, is such that the transistor T2 is rendered conductive by the potential which appears on the terminal PU. The transistor T2 thus shunts relay P and prevents its immediate operation. Relay PP is also unaffected by the bias current which flows. In the circuit CC, the operation of relay LT, at contacts LT3 and LT4 completes a path via resistor R1 to terminal H. While the contact KT remains closed, a current path from terminal H to ground is completed via the terminal PU, and, in accordance with the value of resistor R1, the bias current through resistors R4, R5 is reduced and causes the transistor T2 to turn OFF, thus removing the shunt from relay P, which now operates. In the circuit CC, the operated contacts LT1 to LT2 connect the talk and listen circuit 1 to the exchange wires 6 and 7. Contact LT5 disconnects ground potential from the buzzer outputs 1B to 0B, while contact LT6 prepares a path from the dial pulse circuit DPC to the outputs 1A to 0A of the keypad KP. In the supervisory circuit, operation of relay P at contact P1 completes a holding circuit for itself and relay LT in the circuit CC, independent of the key switch contacts KT. Also, in the circuit CC, the diode D2 in the circuit of transistor T1 is no longer forwardly biased, in which condition the transistor T1 operates to cause the light emitting diode LED to glow, thereby indicating the busy condition of the exchange line. In the supervisory circuit operation of contacts P2 and P3 disconnect the external exchange wires 6 and 7 from the system of calling bells CB while contact P4 opens a point in the path to relay PP, disconnecting the initial bias circuit for transistor T2. The exchange line connection is now complete and conversation may ensue. It will be appreciated that with the arrangement as described above, if the keys KT in two or more circuits CC are operated simultaneously, then the supervisory circuit P relay in parallel with the emitter-collector path of transistor T2 limits the current in the PU path so that no LT relay receives sufficient current to operate, and no circuit action will occur until all but one KT switch is restored. Should the key contacts KT be held operated after the operation of relay P in the supervisory circuit, then the PU common is isolated from the hold path for relays P and LT, by the diode D3, and consequently no other CC circuit can interfere with the holding of the circuit in question. If the connection to the exchange line is not in reply to an incoming call, but the extension station desired to make an outgoing call, then this may be achieved by means of the keypad KP, the contacts to outputs 1A to 0A of which are now rendered operative by means of the relay contact LT6.

3. Hold condition

Should the extension telephone now connected to the public exchange line wish to return to a local extension call, the button KL of the extension telephone is pressed thus applying ground potential to terminal H of the supervisory circuit and short-circuiting relay P. The relay P thus becomes deenergized and its contacts P1 to P4 restore to their normal positions. Contact P4 restoring completes an operating circuit for relay PP, and relay PP operating completes, at contact PP1, a holding circuit for relay PP independent of the ground on terminal H from the operated key KL of the circuit CC. Relay PP also, at contacts PP2 and PP3, disconnects the call bells CB from the exchange line and connects a holding loop thereto over resistor R8, at contact PP4, applies battery via resistor R7 to the bias resistors R4 and R5 to prepare the transistor T2 for operation to guard relay P, and, at contact PP5, applies battery over a connection linking terminals FB1 and FB2 to start the flasher unit FU. The flasher unit comprises a multivibrator circuit, formed by the symmetrically interconnected transistors T4 and T5, and an output transistor T3, the latter having its collector load impedance R9 connected by way of the linked terminals FO and PU to ground via the parallel combination of relay P and the collector-emitter path of transistor T2. Thus, during operation of the flasher unit, alternate potential changes occur at terminal PU which forward and reverse bias the diode D2 in the circuit CC, thus causing the light emitting diodes LED in all circuits CC to flash in step with the operations of the flasher unit, to indicate that the exchange line is being held. Since the original hold circuit for relay LT is now disconnected at contact P1 in the supervisory circuit, release of the button KL in the circuit CC allows the relay LT to restore, so that contacts LT1 – LT6 return to their normal positions. The calling telephone extension may now make an internal call via the internal communication line and following this call the extension may either return to the exchange line by again pressing push button KT or, alternatively, any other telephone extension may connect to the exchange line by pressing their button KT, the circuit action being similar to that described above for the initial exchange line connection, except that upon the operation of relay P, subsequent to the operation of relay LT, contact P4 opens to release relay PP which restores its contacts PP1 to PP5 thus terminating the operation of the flasher unit FU. Although any telephone extension is free to connect to the external exchange line while the latter is in the held condition, it will be appreciated that the flashing indication provided by the light emitting diode will deter an extension from connecting to the exchange line unless it has been indicated via the internal communication circuit that the external caller desires connection to that extension.

4. Release of exchange line

When an extension telephone connected to the external exchange line releases, the hook switch contacts ON1, ON2 and ON3 restore. Contact ON2 restoring, deenergizes relay LT in the circuit CC and relay P in the supervisory circuit, so that the contacts LT1 – LT5, in the circuit CC and the contacts P1 – P4 restore to their normal conditions. The external exchange line is now again in the idle condition.

From the above description it will be appreciated that the invention provides a simple and versatile intercommunication system which enables any one of a plurality of extension telephones to either accept an incoming call from an external exchange or to establish a connection to the external exchange for the purpose of an outgoing call. The system also provides in a simple manner for intercommunication between the extension telephones by way of an internal communication line without requiring a complicated system of extension selection keys. The system as described may be changed in a number of ways without departing from the invention. For example the arrangement described using the drop-back relay DB to connect a specified one of the extension stations to the exchange line in the event of a power failure, could be replaced by a simple arrangement in which at least one of the call bells CB is constituted by the bell of an ordinary dial type telephone which could be located in a central position and which would serve as an additional, emergency, telephone for use in the event of a power failure. Also, where an intercommunication system provides for only one exchange line, as in the embodiment above described some economy may be achieved by removing the dial pulse circuits DPC, together with the dial off-normal and impulsing relays DON and DP from the station circuits, and replacing these by a simple dial pulse circuit located in the exchange line supervisory circuit, together with an associated dial off-normal relay and an impulsing relay, the contacts of which would be connected in the exchange line circuit in well known manner. With this arrangement the keypad terminals 1A to 0A may be connected via an encoder within the station circuits which would provide encoded digital signals over a further group of four signaling wires, common to each station circuit and connected to the single dial pulse circuit over a suitable interface buffer circuit.

From the above description it will be appreciated that the invention provides a simple and versatile intercommunication system which enables any one of a plurality of extension telephones to either accept an incoming call from an external exchange or to establish a connection to the external exchange for the purpose of an outgoing call. The system also provides in a simple manner for intercommunication between the extension telephones by way of an internal communication line without requiring a complicated system of extension selection keys.

What I claim is:

1. A telephone intercommunication system including: a plurality of extension telephone stations, at least one supervisory means providing access to and warning of incoming calls from a communication line external to the system, and at least one internal communication line; the arrangement being such that in an idle condition all of said extension telephone stations are normally interconnected via said internal communication line to provide for communication between any two or more of said extension telephone stations when in a line-looped or off-hook condition, and said supervisory means providing to all of said extension stations, independently of said internal communication line or lines, warning of an incoming call from the corresponding external line; said supervisory means including means for preventing access of other telephone stations to said external exchange line while one of said stations is connected thereto; and each extension telephone station includng manually operable line coupling switch means giving access via the corresponding supervisory means to the corresponding external communication line, independently of said internal communication line or lines; each extension telephone station further including a line coupling relay having changeover contacts for connecting a speech transmission circuit to said internal communication line and to said external line; an energizing current path for said line coupling relay including a switch contact closed by manually operated means; and a holding current path for said relay including at least one self-holding contact of said relay; and said supervisory means including; a first common terminal connected to said energizing current path of said telephone station; a second common terminal connected to said holding current path of each telephone station; and means operated responsive to signal potentials at said first and second common terminals upon completion of both of said energizing and holding current paths of one telephone station, said responsive means being so adapted to control the potential at said first common terminal that energization of any line coupling relay of a further telephone station is inhibited.

2. A system as claimed in claim 1, in which each extension telephone station includes a digital push button assembly arranged so that each push button actuates contacts in each of two electrically separate groups, one of which serves for the selective calling, independently of said internal communication line, of any other station of the system, and the other of which serves for the initiation of dialed code signal transmission for the establishment of an external call, the contacts of said one group being rendered effective when the corresponding telephone station is connected to the internal communication line and the contacts of said other group being rendered effective when said line coupling switch means is operative to establish a connection to a corresponding external communication line.

3. A system as claimed in claim 2, in which a changeover contact of the said line coupling relay is arranged to connect a common source of potential alternatively to each of two circuits respectively including said electrically separate groups of contacts, whereby one of said groups of contacts is rendered effective when said relay is energized and the other is rendered effective when said relay is idle.

4. A system as claimed in claim 1, including means responsive to a failure of the power supply for operation of the system, said means being adapted to couple a single one of said telephone stations directly to said external line.

* * * * *